United States Patent
Roeper et al.

[11] Patent Number: 5,884,964
[45] Date of Patent: Mar. 23, 1999

[54] HYBRID HEADER FOR CONVERTIBLE TOP

[75] Inventors: Dieter Roeper, Ulm, Germany; Dennis B. Carroll, Ann Arbor, Mich.

[73] Assignee: Dura Convertible Systems, Inc., Adrian, Mich.

[21] Appl. No.: 806,096

[22] Filed: Feb. 25, 1997

Related U.S. Application Data

[60] Provisional application No. 60/012,232, Feb. 26, 1996.

[51] Int. Cl.[6] ............................... B62D 25/00; B60J 7/12
[52] U.S. Cl. ......................... 296/189; 296/121; 296/118; 280/751
[58] Field of Search ..................................... 296/189, 121, 296/107.01, 107.03, 108, 109, 111, 114, 118; 280/751

[56] References Cited

U.S. PATENT DOCUMENTS

| | | | |
|---|---|---|---|
| 3,904,223 | 9/1975 | Wilfert et al. | 280/751 |
| 4,099,767 | 7/1978 | Kania et al. | 280/751 |
| 4,537,440 | 8/1985 | Brockway et al. | 296/108 |
| 4,991,904 | 2/1991 | Zweigart | 296/121 |
| 5,580,116 | 12/1996 | Patel et al. | 296/189 X |
| 5,779,271 | 7/1998 | Dorow et al. | 296/189 X |

*Primary Examiner*—Joseph D. Pape
*Attorney, Agent, or Firm*—David A. Greenlee

[57] ABSTRACT

A hybrid convertible top header is formed of a transverse steel tube flattened at its ends and having end fittings for attachment to the front ends of top front side rails. In one embodiment a pair of apertured latch-mounting steel plates are welded to the tube and the entire steel structure is encapsulated in a thermoplastic shroud comprising upper and lower moldings that are bonded along front and rear flanges. The top cover is secured to the front flange, while a closed or open cell foam pad is mounted on the rear flange to provide an energy-absorbing cushion in case of occupant impact on the header. In another embodiment, the plates are not welded to the tube, and the tube and plates are molded into a closed or open cell reaction injected molded polyurethane body that has sufficient rigidity to maintain a predetermined dimensional relationship between the plates and tube. The polyurethane body is also sufficiently soft to provide sufficient energy absorption in the event of occupant impact to meet FMVSS requirements. In a variant of this embodiment, the energy-absorbing segment can be of different density than the main body.

7 Claims, 3 Drawing Sheets

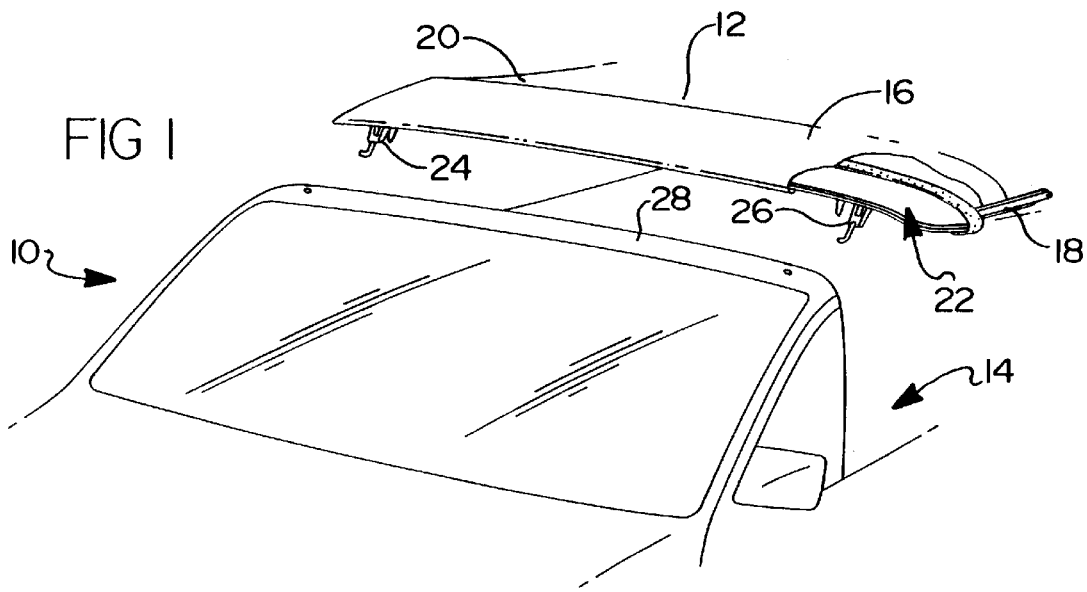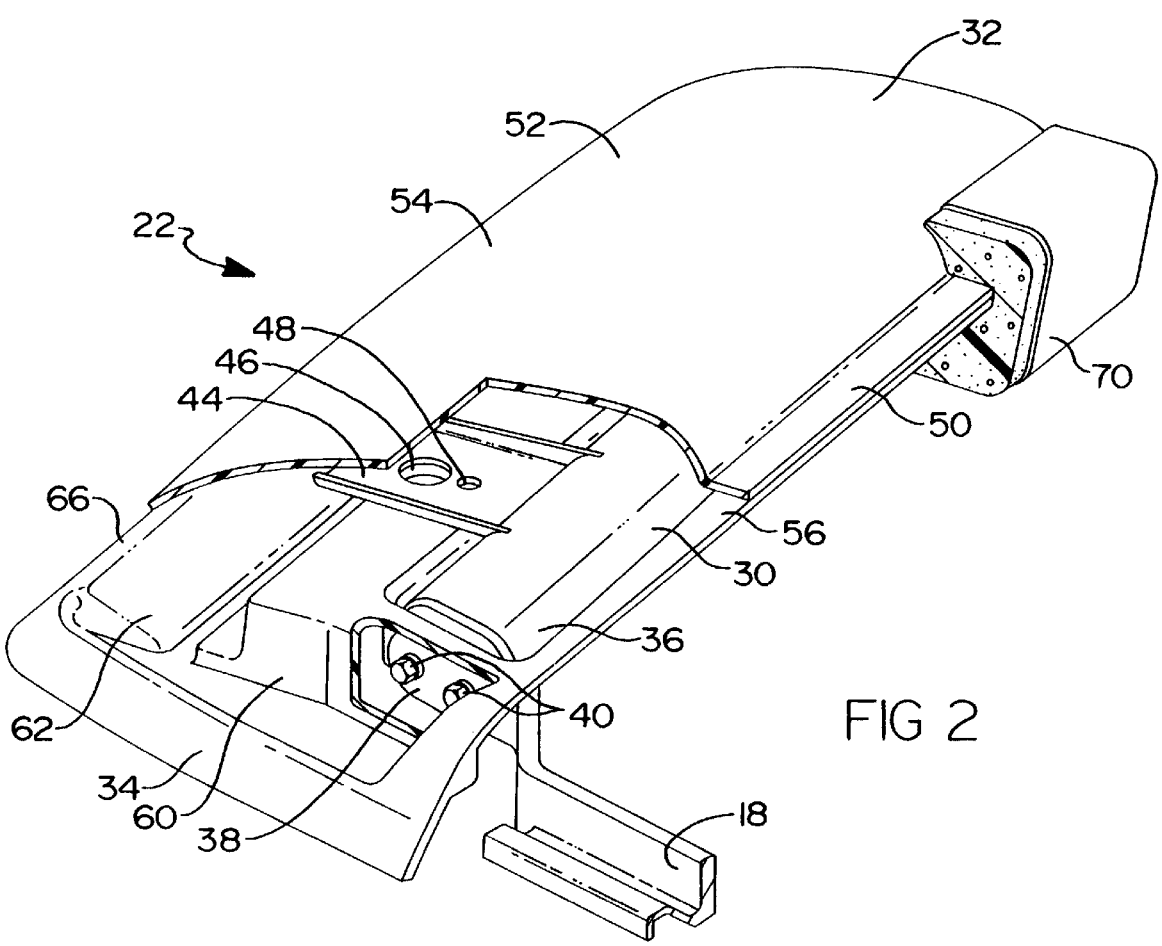

5,884,964

HYBRID HEADER FOR CONVERTIBLE TOP

RELATED APPLICATION

This application claims priority of U.S. Provisional Patent application Ser. No. 60/012,232, filed Feb. 26, 1996.

BACKGROUND OF THE INVENTION

This invention relates generally to vehicle convertible tops and, more particularly, to a hybrid header for a vehicle convertible top.

Contemporary convertible tops comprise a pair of spaced collapsible articulated linkages interconnected by spaced transverse bows. The front or #1 bow is constructed to latch to the vehicle header and is itself called the top header. In some tops, the top terminates in a rear bow which is movable to enable operation of a tonneau cover, upon which the rear bow rests in top raised position, as shown in U.S. Pat. No. 5,067,768 to Fischbach.

Conventionally, these bows are made of stamped steel, with the header formed of several pieces of steel and mounting brackets for the top latches, such as is shown in U.S. Pat. No. Re. 34,033 to Godette. Consequently, these contemporary headers are complex, bulky, heavy, and expensive to manufacture. Since weight is critical in contemporary vehicles, it would be desirable to provide a header which is lighter, more compact, simpler and less expensive than contemporary steel headers.

Occupant safety is a continuing concern in vehicle design. Consequently, it would also be desirable to provide a header that incorporates padding to lessen the effect of forceful occupant contact with the header.

SUMMARY OF THE INVENTION

It is therefore an object of this invention to provide a header which is lighter, more compact, simpler and less expensive than contemporary steel headers.

Another object of this invention is to provide a header that incorporates integral padding to lessen the effect of forceful occupant contact with the header.

In one aspect, this invention features a hybrid header for a convertible top which has spaced latches for securing the header to the vehicle windshield, spaced articulated linkages comprising side rails, including front side rails, which are interconnected by spaced bows and by the header and support a top cover. Fasteners attach the front side rails and latches to the header. The header comprises a transverse steel structural assembly mounting the ends of the front side rails and mounting the latches, a thermoplastic shroud having a main portion which encapsulates the structural assembly and includes a transverse surface for mounting the front edge of the top cover, and a rearward transverse energy absorbing segment positioned to receive and cushion the impact of a vehicle occupant during a vehicle collision.

In one embodiment the transverse steel structural assembly comprises an elongated steel tube having end portions for mounting the front side rails and steel plates for mounting the latches, and the thermoplastic shroud is a closed or open cell reaction injection molded (RIM) polyurethane foam having sufficient structural rigidity to maintain the plates and tube in a predetermined dimensional relationship, while sufficiently flexible in the energy-absorbing segment to provide a predetermined rate of energy absorption.

The thermoplastic shroud may be formed of dual-density RIM polyurethane wherein the main portion has a first predetermined density and the energy-absorbing segment has a second, lower predetermined density.

In another embodiment, the thermoplastic shroud comprises an upper decorative plastic molding, a lower decorative plastic molding bonded together to envelope the structural tube to form the assembly, and a transverse windshield seal secured to the lower molding, and the moldings are apertured to allow passage of side rail and latch fasteners to engage the tube and plates.

In this embodiment, the transverse structural tube is a cylindrical steel tube which is flattened at its ends to facilitate attachment to the front side rails, the plates are apertured to receive the latch-mounting fasteners and are welded to the structural tube, and the moldings are vacuum formed thermoplastic members that are welded or adhesively bonded together along front and rear transverse mating flanges.

The rearward transverse energy absorbing section is a strip of interior occupant protective energy-absorbing open or closed cell foam padding secured to the moldings along the rear flange. The foam padding may be of dual density to provide segments of different densities and rates of energy absorption.

These and further objects and features of this invention will become more readily apparent upon reference to the following detailed description of a preferred embodiment, as illustrated in the accompanying drawings, in which:

BRIEF DESCRIPTION OF THE DRAWINGS

FIG. 1 a partial perspective view of a convertible vehicle having a header according to this invention;

FIG. 2 is a perspective view of a top header assembly according this invention, partially broken away to show details of construction;

DETAILED DESCRIPTION OF PREFERRED EMBODIMENTS

Figure 3:
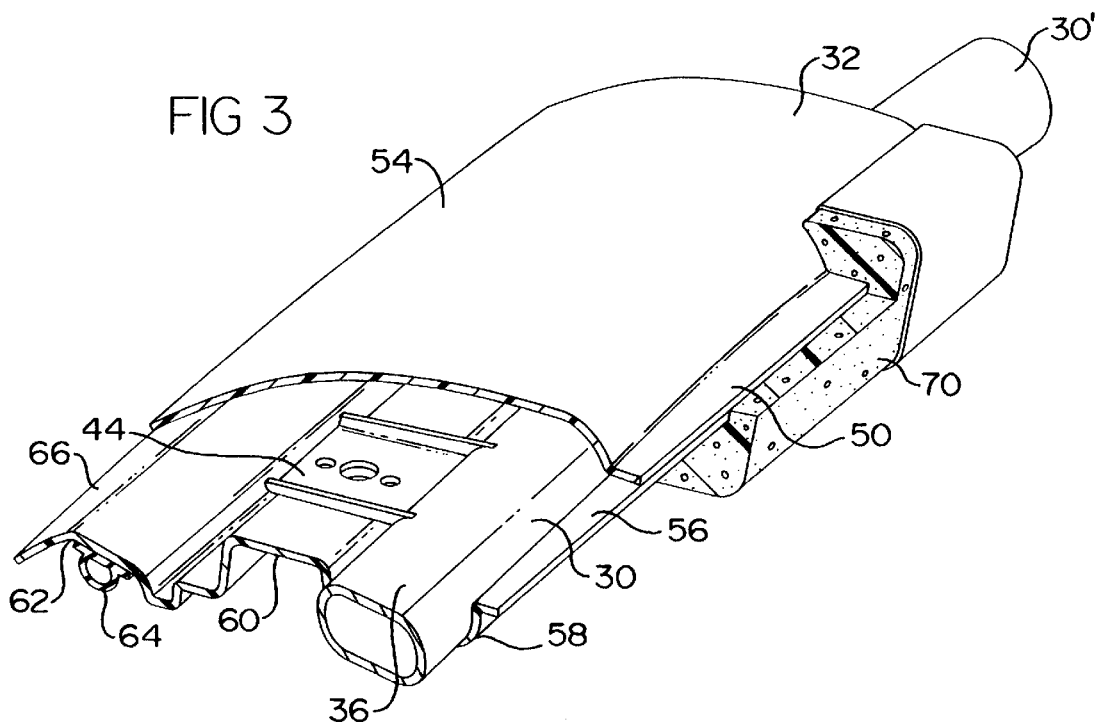
FIG. 3 is a view similar to FIG. 2, but being sectioned to better show details of construction.

As shown in FIG. 1, of the drawings, a convertible vehicle 10 mounts a convertible top 12 to selectively open and close a passenger compartment 14. Top 12 comprises a conventional articulated frame which supports a fabric or vinyl top cover 16. A top of this type is more fully shown in U.S. Pat. No. 5,067,768. The frame is formed of spaced linkages of pivotally interconnected side rails, including front side rails 18, 20 conventionally interconnected by a header 22 and spaced transverse bows (only one bow 23 is illustrated). Latches 24, 26 are mounted on header 22 to latch it to a windshield header 28.

Figure 4:
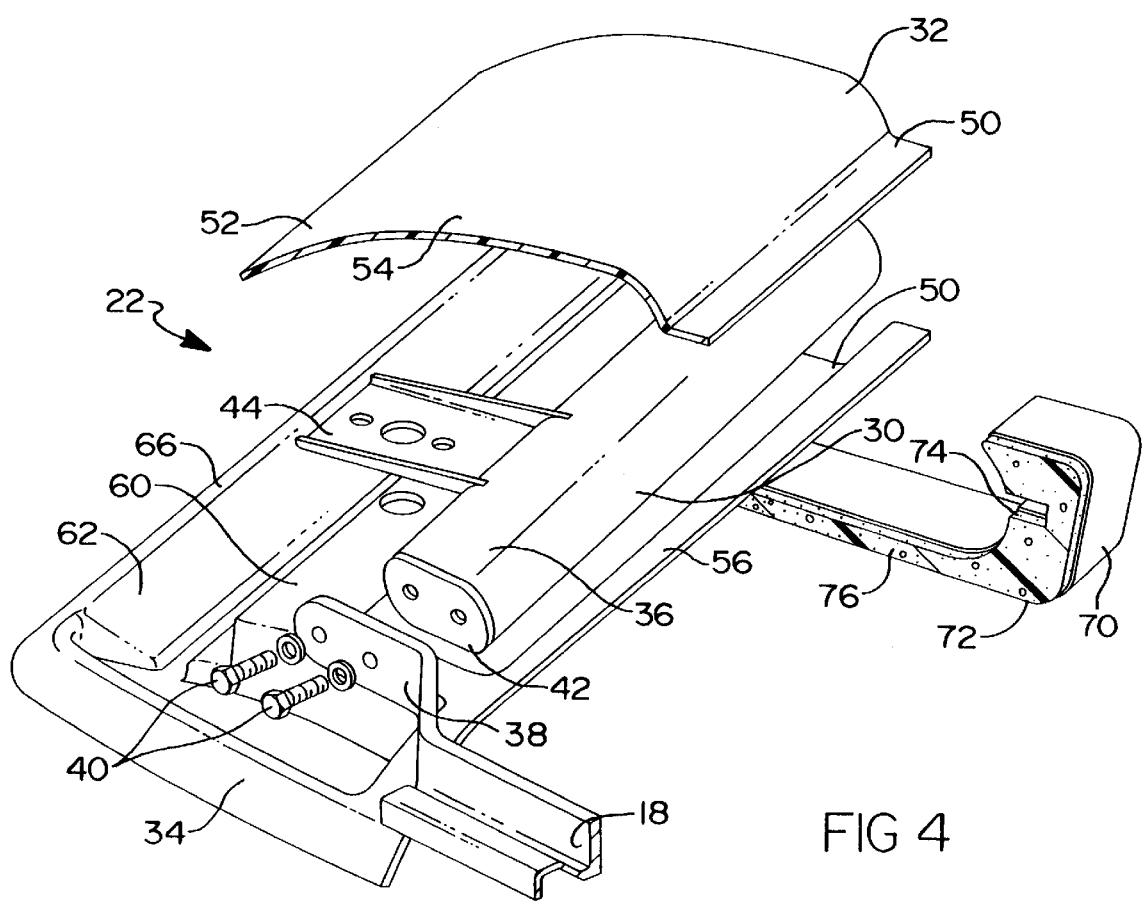
FIG. 4 is an exploded perspective view of the header assembly of FIG. 2.

In the embodiment shown in FIGS. 2, 3 and 4, header 22 comprises a cylindrical steel structural tube 30, an upper plastic molding 32, and a lower plastic molding 34. The ends 36 (only one illustrated) of tube 30 are flattened into a generally oval shape for mating with an end plate 38 extending from the front end of front side rail 18 of the convertible top side linkage. The other end of tube 30 (not illustrated) is similarly formed and attached to an identical side front rail. Bolts 40 attach end plate 38 to an end cap 42 welded to the end of tube 30.

Latch mounting brackets 44 (only one illustrated) are welded to and extend from tube 30. Brackets 44 include mounting apertures 46, 48 which receive mounting bolts 49 to mount header latches 24, 26.

Upper molding 32 is formed with a rear transverse flange 50 and a curved upper surface 52 which overlies tube 30 and brackets 44, terminating in a leading flange 54. Lower molding 34 extends forwardly from a rear flange 56 to a transverse pocket 58 for receiving tube 30 and an upward transverse depression 60 for housing electrical wiring or mechanical or hydraulic components. Lower molding 34 contains a transverse forward pocket 62 for receiving a transverse weather seal 64, and terminates in a front flange 66 to which top cover 16 is stapled or adhesively bonded.

After tube 30 is secured to side rails 18, 28 it is placed in lower molding 34 and upper molding 32 is placed over it and front flanges 54 and 66 are heat welded or adhesively bonded, as are rear flanges 50 and 56. Header latches 24, 26 can then be mounted, along with any components, in depression 60, and seal 64 installed. At this point, a transverse segment of energy absorbing padding 70 is installed over mated flanges 50 and 56. The top cover can be attached to front flange 54 at any convenient time.

Padding 70 has a main body 72 bisected by a slot 74 for receiving mated flanges 50 and 56. A bottom segment 76 extends forwardly to underlie lower molding 34. Padding 70 can be a closed or open cell foam for absorbing occupant impact energy. It can be formed of single density or multiple density foam and can take any desired external shape.

This hybrid header construction provides a lighter and less expensive header. This hybrid construction enables a variety of outer cosmetic variances by providing different moldings. This enables inexpensive and quick styling changes. The plastic moldings can have any permanent color, avoiding paint wear or chipping. This hybrid construction enables the ready incorporation of the inner energy absorbing padding.

Figure 6:
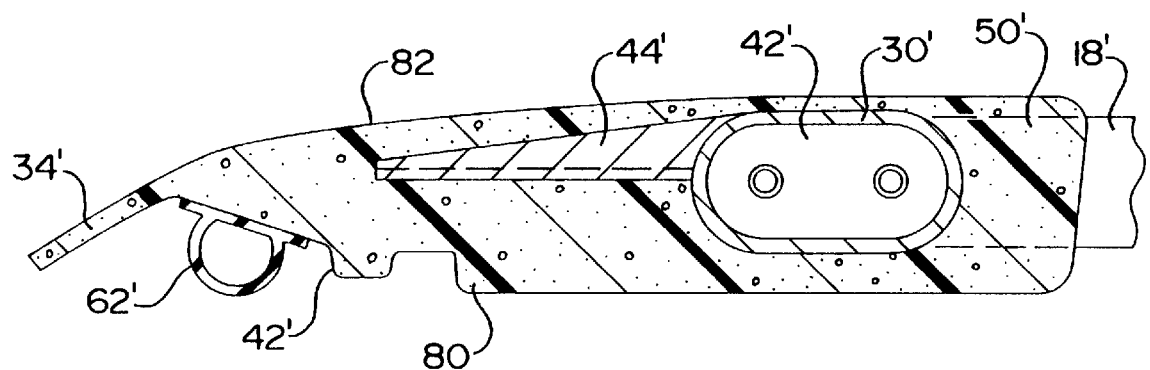
FIG. 6 is similar to FIG. 5, but illustrating a variant form of this embodiment.

Another embodiment of this invention is illustrated in FIG. 6, in which elements identical to elements in the FIGS. 2–4 embodiment bear the same reference numbers primed. Here the steel latch-mounting plates 44' are not welded to the steel tube 30'. Rather, plates 44' and steel tube 30' are completely encapsulated within a unitary body 80 of RIM self-skinned rigid cellular polyurethane foam. Tube 30' and plates 44' are inserted into a mold which is contoured in the shape of the outer surface 82 of the header and is surface textured. It includes an integral energy-absorbing segment 50'. Urethane and a reaction agent are injected into the mold (not illustrated) in a well-known manner to encapsulate the structural steel elements 30', 44'. The urethane then cures and is removed from the mold. The finished hybrid header 80 is now ready for installation in a vehicle. The self-skinned urethane surface 82 can be colored and textured to provide any desired interior effect.

The density and resultant rigidity of the cured polyurethane is closely controlled to provide sufficient rigidity to maintain a precise dimensional relationship between the tube and the plates, but is flexible enough in the energy absorbing segment to provide a controlled rate of collapse and cushioning when impacted by a vehicle occupant. This rate of energy absorption is selected to meet the requirements of Federal Motor Vehicle Safety Standard (VMVSS) No. 201, *Occupant Protection.*

Figure 5:
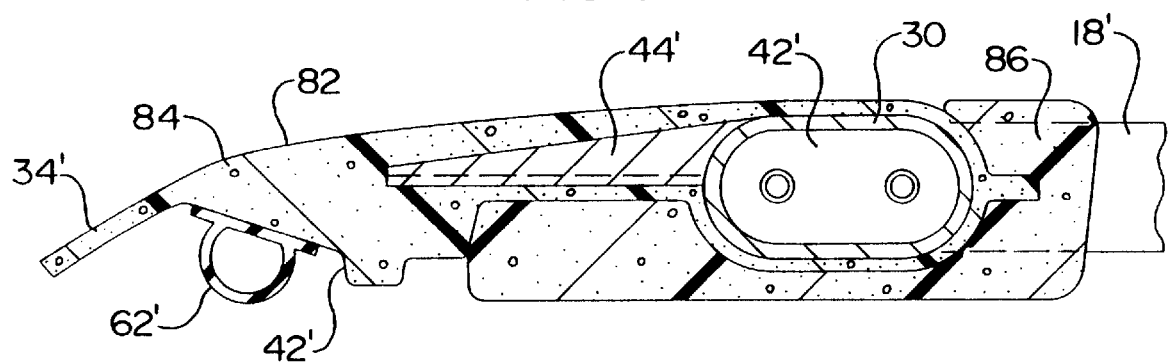
FIG. 5 is a transverse sectional view of another embodiment of header of this invention.

It may be found that the density and rigidity of the main body of foam surrounding the structural elements is not the density desired to provide an energy-absorbing segment. In that event, a foam body having an energy-absorbing segment that has different physical characteristics than body 80 can be provided by providing a dual density RIM polyurethane body. This variant is depicted in FIG. 5, where elements identical to FIG. 6 have the same reference number. Here, structural steel elements 30' and 44' are molded into structural foam body 84, while an energy-absorbing segment 86, having a different density is molded onto main body 84, maintaining the same outer surface configuration 52.

As with the FIGS. 2–4 embodiment, the hybrid headers of FIG. 6 or FIG. 5 provide a lighter and more stylish convertible top header that is demonstrably lighter and stronger than a conventional steel header, and incorporates an integral energy-absorbing segment.

While only preferred embodiments have been illustrated and described, obvious modifications thereof are contemplated within the scope of this invention. For example, this same hybrid structure can be applied to a movable rear bow, such as disclosed in the Fischbach patent. Also, the same dual density closed or open cell polyurethane construction can be applied to the energy-absorbing segment 50 of the FIGS. 2–4 embodiment to provide a selected variable rate of energy absorption.

Structurally, the positions of the steel tube and latch-mounting plates within the header could be reversed. Also, the tube could have a rectangular, rather than circular cross-section. The steel structural assembly could also have a different, equivalent configuration within the hybrid structure.

We claim:

1. A hybrid header for a vehicle convertible top which has spaced latches for securing the header to the vehicle windshield header, spaced articulated linkages consisting of side rails, including front side rails, which are interconnected by spaced bows and by the header, fasteners for attaching the front side rails and latches to the header, and a fabric top cover, wherein the header comprises a transverse steel structural assembly mounting the ends of the front side rails and mounting the latches, a thermoplastic shroud having a main portion which encapsulates the structural assembly and includes a transverse surface for mounting the front edge of the top cover, and a rearward transverse energy absorbing segment positioned to receive and cushion the impact of a vehicle occupant during a vehicle collision.

2. The hybrid header of claim 1, wherein the transverse steel structural assembly comprises an elongated steel tube having end portions for mounting the front side rails and steel plates for mounting the latches, and the thermoplastic shroud is a closed or open cell RIM polyurethane foam having sufficient structural rigidity to maintain the plates and tube in a predetermined dimensional relationship, while sufficiently flexible in the energy-absorbing segment to provide a predetermined rate of energy absorption.

3. The hybrid header of claim 2, wherein the thermoplastic shroud is formed of dual-density RIM polyurethane wherein the main portion has a first predetermined density and the energy-absorbing segment has a second, lower predetermined density.

4. The hybrid header of claim 1, wherein the transverse steel structural assembly comprises an elongated steel tube having end portions for mounting the front side rails and steel plates bonded to the steel tube for mounting the latches, and the thermoplastic shroud comprises an upper decorative plastic molding, a lower decorative plastic molding bonded together to envelope the structural tube and plates, and a transverse windshield seal secured to the lower molding, and the moldings are apertured to allow passage of the side rail and latch fasteners to engage the tube and plates.

5. The hybrid header of claim 4, wherein the transverse structural tube is a cylindrical steel tube which is flattened at its ends to facilitate attachment to the front side rails, the plates are apertured to receive the latch-mounting fasteners and are welded to the structural tube, and the moldings are vacuum-formed thermoplastic members that are welded or adhesively bonded together along front and rear transverse mating flanges.

6. The hybrid header of claim 5, wherein the rearward transverse energy absorbing segment is a strip of interior occupant protective energy-absorbing closed or open cell foam padding secured to the moldings along the rear flange.

7. The hybrid header of claim 6, wherein the foam padding is of dual density to provide segments of different densities and rates of energy absorption.

* * * * *